United States Patent
Chien et al.

(10) Patent No.: US 11,782,333 B2
(45) Date of Patent: Oct. 10, 2023

(54) PROJECTION DEVICE AND COLOR GAMUT SWITCHING METHOD THEREOF

(71) Applicant: Coretronic Corporation, Hsin-Chu (TW)

(72) Inventors: Cheng-Che Chien, Hsin-Chu (TW); Ming-Tsung Weng, Hsin-Chu (TW); Kuan-Lun Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/169,545

(22) Filed: Feb. 8, 2021

(65) Prior Publication Data
US 2021/0263400 A1    Aug. 26, 2021

(30) Foreign Application Priority Data

Feb. 25, 2020   (CN) .......................... 202010114728.2

(51) Int. Cl.
*G03B 21/20* (2006.01)
*G03B 33/08* (2006.01)
*G02B 26/00* (2006.01)

(52) U.S. Cl.
CPC ......... *G03B 21/204* (2013.01); *G02B 26/008* (2013.01); *G03B 21/208* (2013.01); *G03B 33/08* (2013.01)

(58) Field of Classification Search
None
See application file for complete search history.

(56) References Cited

U.S. PATENT DOCUMENTS

2004/0246448 A1\* 12/2004 Ogawa ................... H04N 9/315
                                                  348/E9.027
2010/0053558 A1\* 3/2010 Yanagisawa ......... G03B 21/142
                                                        353/20

(Continued)

FOREIGN PATENT DOCUMENTS

| CN | 101424865 | 5/2009 |
| CN | 103292254 | 9/2013 |

(Continued)

OTHER PUBLICATIONS

"Office Action of China Counterpart Application", dated Mar. 21, 2022, p. 1-p. 9.

*Primary Examiner* — Bao-Luan Q Le
*Assistant Examiner* — Danell L Owens
(74) *Attorney, Agent, or Firm* — JCIPRNET

(57) ABSTRACT

The disclosure relates to a projection device and a color gamut switching method thereof. The projection device includes a light source, a wavelength conversion element, an optical engine module, a projection lens module, and a filter element. The light source is configured to emit a first light beam. The wavelength conversion element is disposed on a transmission path of the first light beam, and the wavelength conversion element is configured to convert the first light beam into a second light beam. The optical engine module is disposed on a transmission path of the second light beam from the wavelength conversion element. The optical engine module is configured to convert the second light beam to form an image beam. The projection lens module is disposed on a transmission path of the image beam from the optical engine module. The filter element is removably disposed on the transmission path of the second light beam or the image beam.

10 Claims, 10 Drawing Sheets

(56) References Cited

U.S. PATENT DOCUMENTS

2010/0225887 A1* 9/2010 Sato ............... G03B 21/005
                                                    353/31
2019/0072244 A1* 3/2019 Masuda ............... F21V 9/40
2019/0369476 A1* 12/2019 Wu ................... G02B 5/20

FOREIGN PATENT DOCUMENTS

| CN | 104765240 | | 7/2015 |
| CN | 106896494 | | 6/2017 |
| CN | 106896494 A | * | 6/2017 |
| CN | 108139658 | | 6/2018 |
| JP | 2624993 B2 | * | 6/1997 |

* cited by examiner

PROJECTION DEVICE AND COLOR GAMUT SWITCHING METHOD THEREOF

CROSS-REFERENCE TO RELATED APPLICATION

This application claims the priority benefit of China application serial no. 202010114728.2, filed on Feb. 25, 2020. The entirety of the above-mentioned patent application is hereby incorporated by reference herein and made a part of this specification.

BACKGROUND OF THE DISCLOSURE

1. Field of the Disclosure

The disclosure relates to a projection technology, and more particularly, to a projection device.

2. Description of Related Art

With the development of a projection technology, the diversification of information presentation modes has been promoted, for example: architectural light sculpture projection, or immersive visual presentation of head-mounted display devices. The applications are all visible traces of projection devices. At present, most of the mainstream projection devices use a color wheel that rotates at a high speed to generate a required color for a passing projection light beam. In general, the color performance of the projection light beam formed by the color wheel must conform to a color gamut specification Rec.709. However, in some special situations, for example, the display of visual design works or digital image presentation with rich colors, the requirements for color performance are higher (for example, a color gamut specification DCI-P3). Projection devices that only conform to the color gamut specification Rec.709 cannot meet such requirements.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE DISCLOSURE

The disclosure provides a projection device with switchable color gamut, which can meet color requirements in different usage situations.

The disclosure provides a color gamut switching method of a projection device, which facilitates the switching of a color gamut area.

In order to achieve one or a part or all of the foregoing or other objectives, an embodiment of the disclosure provides a projection device. The projection device includes a light source, a wavelength conversion element, an optical engine module, a projection lens module, and a filter element. The light source is configured to emit a first light beam. The wavelength conversion element is disposed on a transmission path of the first light beam, and the wavelength conversion element is configured to convert the first light beam into a second light beam. The optical engine module is disposed on a transmission path of the second light beam from the wavelength conversion element. The optical engine module is configured to convert the second light beam to form an image beam. The projection lens module is disposed on a transmission path of the image beam from the optical engine module. The filter element is removably disposed on the transmission path of the second light beam or the image beam.

In order to achieve one or a part or all of the foregoing or other objectives, an embodiment of the disclosure provides a color gamut switching method of a projection device. The color gamut switching method of the projection device includes: providing a filter element; determining that the projection device is set in a first mode or a second mode; after confirming that the projection device is set in the first mode, moving or rotating the filter element to a transmission path of a second light beam or an image beam; and after confirming that the projection device is set in the second mode, moving or rotating the filter element away from the transmission path of the second light beam or the image beam. The filter element is suitable for the projection device. The projection device includes a light source, a wavelength conversion element, an optical engine module, a projection lens module, and a filter element. The light source is configured to provide a first light beam. The wavelength conversion element is disposed on a transmission path of the first light beam, and is configured to convert the first light beam to form a second light beam. The optical engine module is disposed on a transmission path of the second light beam, and is configured to convert the second light beam to form an image beam. The filter element is removably disposed on the transmission path of the second light beam or the image beam. A color gamut area of the projection device set in the first mode is greater than a color gamut area of the projection device set in the second mode.

Based on the foregoing, in the projection device according to the embodiment of the disclosure, a first light beam emitted by the light source is sequentially converted into a second light beam and an image beam under the action of the wavelength conversion element and the optical engine module, respectively. The filter element is removably disposed on a transmission path of the second light beam or the image beam, so that the projection device can be switched between different color gamut to meet the color requirements in different use situations. In another aspect, in the color gamut switching method of the projection device according to the embodiment of the disclosure, the filter element moves into or out of the transmission path of the second light beam or the image beam in a moving or rotating manner, which can simplify the operation complexity of the projection device during color gamut switching and help to improve the real-time performance and convenience of the color gamut switching thereof.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
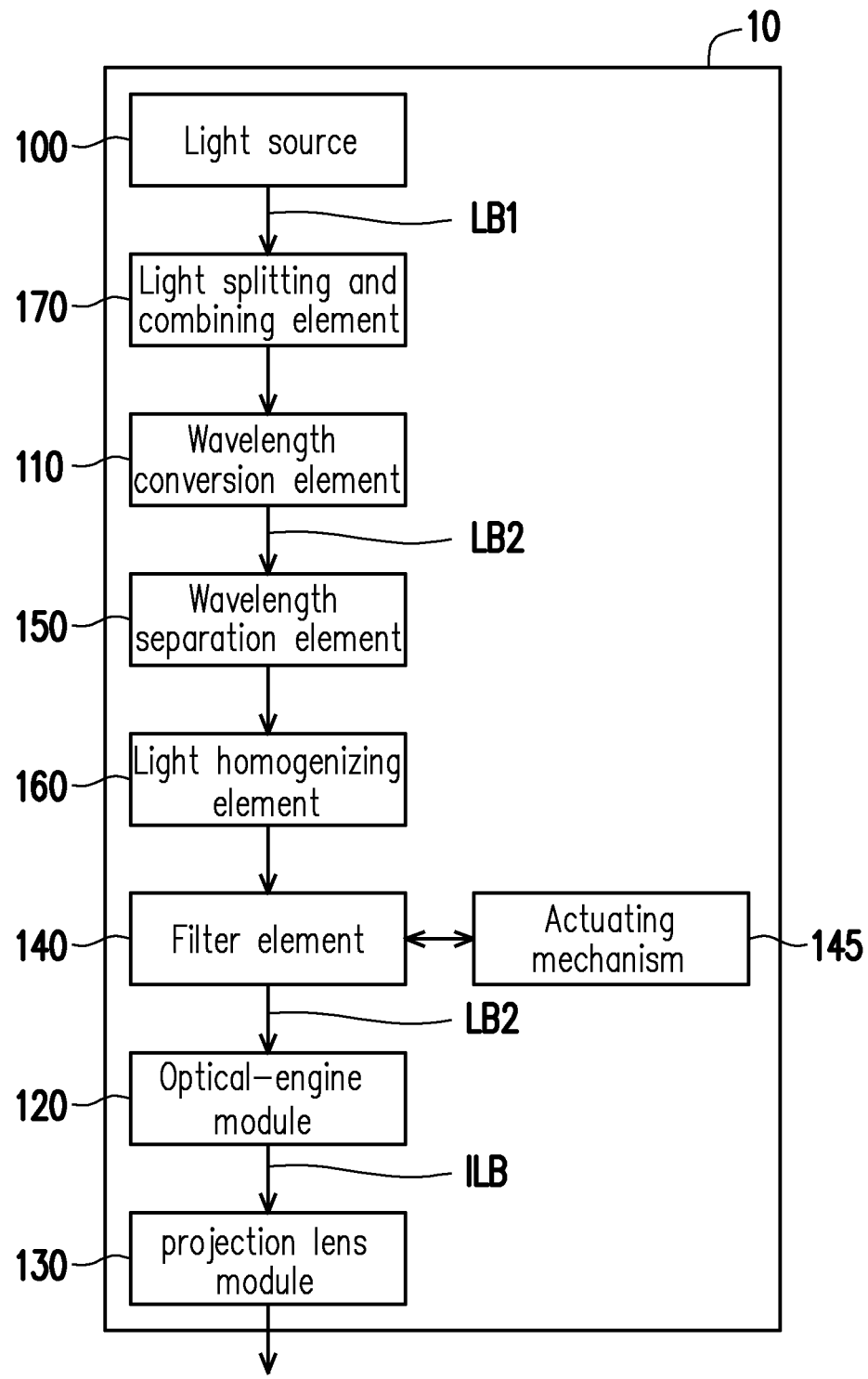
FIG. 1 is a schematic diagram of a projection device according to a first embodiment of the disclosure.
Figure 2:
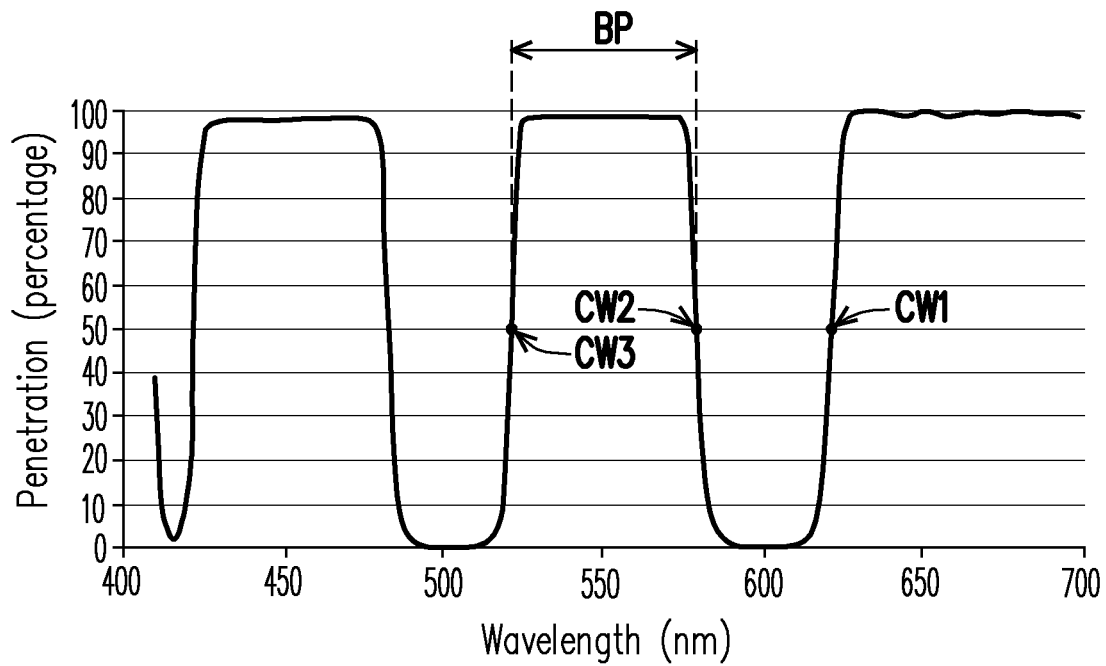
FIG. 2 is a graph of penetration versus wavelength of a filter element of FIG. 1.
Figure 3:
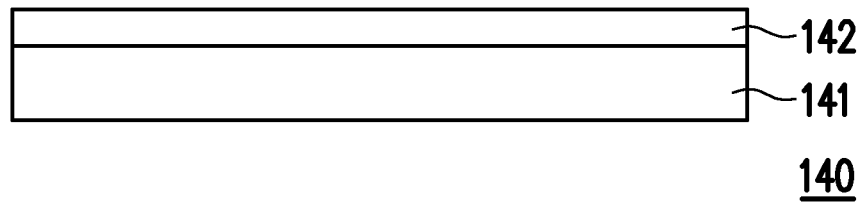
FIG. 3 is a schematic diagram of the filter element of FIG. 1.
Figure 4:
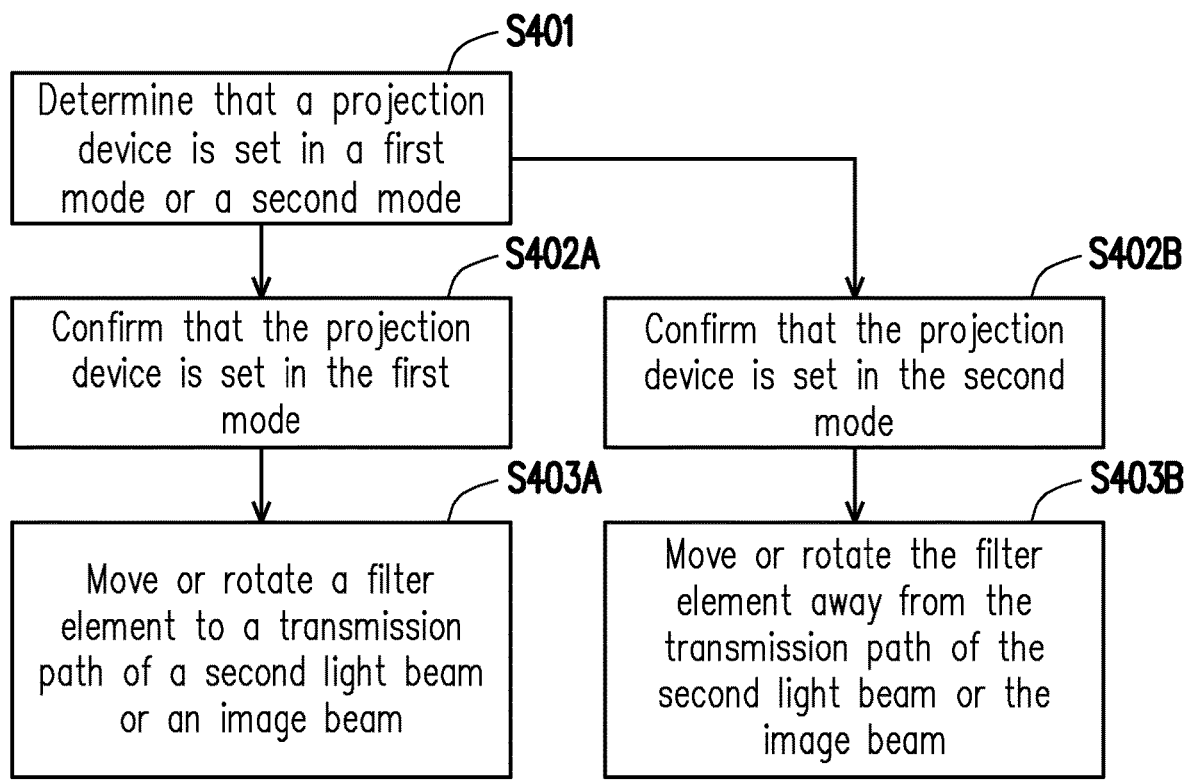
FIG. 4 is a flowchart of a color gamut switching method of the projection device of FIG. 1.
Figure 5A:
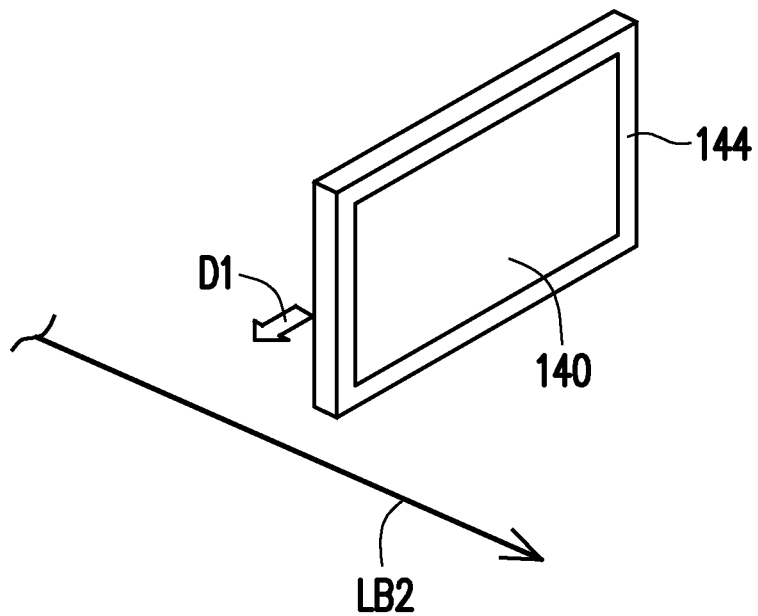
FIG. 5A and FIG. 5B are schematic diagrams of a first mode and a second mode of the projection device of FIG. 1.
Figure 5B:
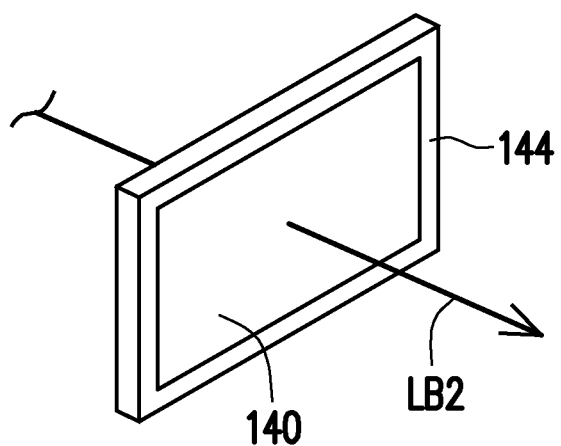
Figure 6:
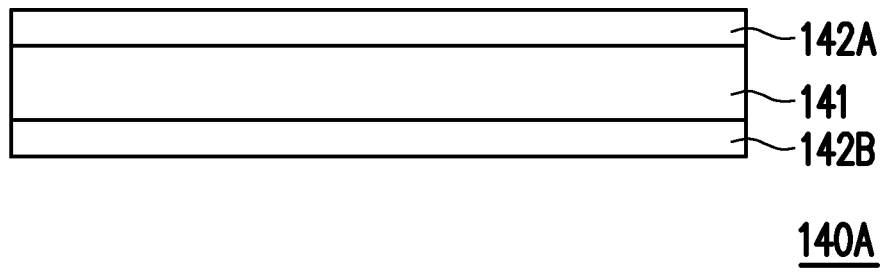
FIG. 6 is a schematic diagram of a filter element according to another embodiment of the disclosure.
Figure 7A:
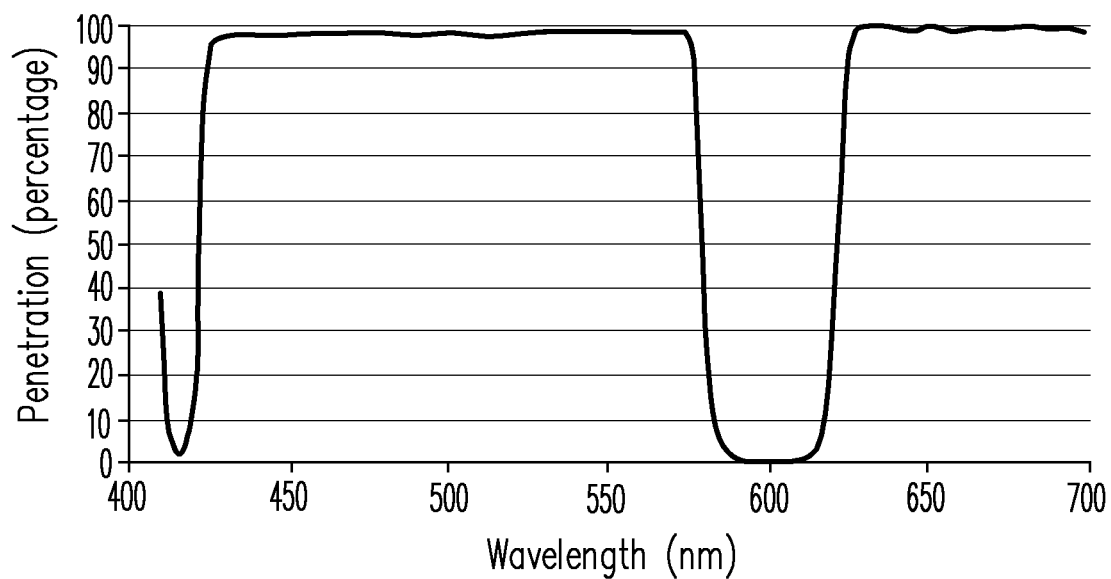
FIG. 7A and FIG. 7B are graphs of penetration versus wavelength of a first filter layer and a second filter layer of a filter element according to another embodiment of the disclosure, respectively.
Figure 7B:
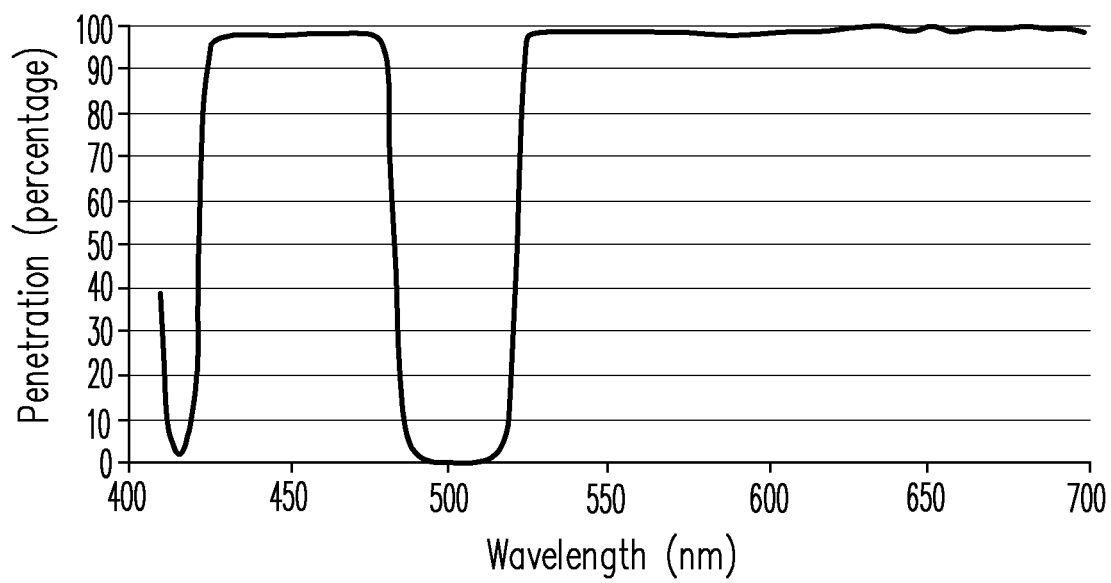
Figure 8:
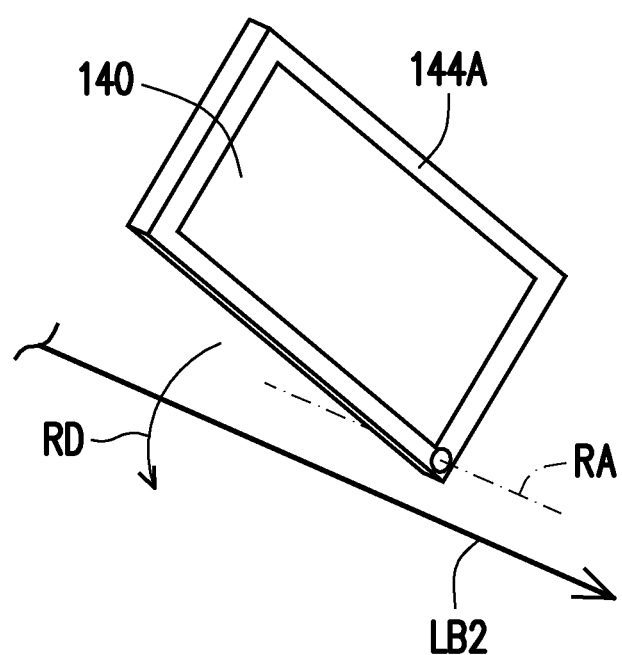
FIG. 8 is a schematic diagram of color gamut switching of a projection device according to another embodiment of the disclosure.

FIG. 1 is a block diagram of a projection device according to a first embodiment of the disclosure. FIG. 2 is a graph of penetration versus wavelength of a filter element of FIG. 1. FIG. 3 is a schematic diagram of the filter element of FIG. 1. FIG. 4 is a flowchart of a color gamut switching method of the projection device of FIG. 1. FIG. 5A and FIG. 5B are schematic diagrams of a first mode and a second mode of the projection device of FIG. 1. FIG. 6 is a schematic diagram of a filter element according to another embodiment of the disclosure. FIG. 7A and FIG. 7B are graphs of penetration versus wavelength of a first filter layer and a second filter layer of a filter element according to another embodiment of the disclosure, respectively. FIG. 8 is a schematic diagram of color gamut switching of a projection device according to another embodiment of the disclosure. In particular, for the sake of clarity, FIG. 5A and FIG. 5B only illustrate a partial transmission path of a filter element 140 and a second light beam LB2 in FIG. 1.

Referring to FIG. 1, the projection device 10 includes a light source 100, a wavelength conversion element 110, an optical engine module 120, a projection lens module 130, and a filter element 140. In detail, the light source 100 is configured to emit a first light beam LB1. For example, the light source 100 may include a plurality of visible light emitting elements, a plurality of non-visible light emitting elements, or a combination thereof. The visible light emitting element may be a light emitting diode (LED) or a laser diode (LD). The non-visible light emitting element may include, but is not limited to, an ultraviolet light emitting diode.

The wavelength conversion element 110 is disposed on a transmission path of the first light beam LB1, and the wavelength conversion element 110 is configured to convert the first light beam LB1 into a second light beam LB2. For example, the wavelength conversion element 110 may include a substrate (not shown), a wavelength conversion layer (not shown) disposed on the substrate, and a rotation axis (not shown) passing through the center of the substrate. The wavelength conversion element 110 has a penetrating region (not shown) surrounding around the rotation axis and at least one light conversion region (not shown). The wavelength conversion layer includes at least one wavelength conversion material (for example, a red-light wavelength conversion material and/or a green-light wavelength conversion material) located in the at least one light conversion region. The wavelength conversion material may include a phosphor, a quantum dot, or a combination thereof. The substrate may be a light-transmitting substrate or a reflective substrate (for example, a metal substrate). In other words, the wavelength conversion element 110 of this embodiment is, for example, a phosphor wheel. The wavelength conversion element 110 may be rotated according to the rotation axis thereof, so that the penetrating region thereof and the at least one light conversion region pass through a transmission path of the first light beam LB1 sequentially and repeatedly. In this embodiment, the first light beam LB1 is, for example, blue light. The second light beam LB2 formed by the wavelength conversion element 110 under the irradiation of the blue light (that is, the first light beam LB1) may include red light, green light or yellow light formed (converted) after passing through the light conversion region and blue light not converted after passing through the penetrating region. That is, the wavelength conversion element 110 is configured to convert at least one part of the first light beam LB1. However, the disclosure is not limited thereto.

The optical engine module 120 is disposed on a transmission path of the second light beam LB2 from the wavelength conversion element 110, and the optical engine module 120 is configured to convert the second light beam LB2 to form an image beam ILB. For example, the optical engine module 120 may include, but is not limited to, a digital micro-mirror device (DMD), a reflective liquid crystal on silicon (LCoS) or a transmissive spatial light modulator (SLM), such as a light-transmitting liquid crystal panel.

The projection lens module 130 is disposed on a transmission path of the image beam ILB from the optical engine module 120 and is adapted to project the image beam ILB from the optical engine module 120 onto an imaging surface (not shown). The projection lens module 130 may be any type of projection lens module known to those of ordinary skill in the art to which the disclosure pertains, which is not limited herein. For example, the optical engine module 120 and the projection lens module 130 may sequentially convert the second light beams LB2 of different colors into the image beams ILB of different colors to generate images of different colors on a screen. The visual persistence effect of human eyes enables a viewer to visualize a color image picture. However, the disclosure is not limited thereto.

Further, the filter element 140 is removably disposed on the transmission path of the second light beam LB2 or the image beam ILB. For example, in this embodiment, the filter element 140 may be selectively disposed on the transmission path of the second light beam LB2 from the wavelength conversion element 110, and the second light beam LB2 is transmitted to the optical engine module 120 after passing through the filter element 140. For example, the filter element 140 is disposed between the wavelength conversion element 110 and the optical engine module 120. However, the disclosure is not limited thereto. It is worth mentioning that the filter element 140 has at least two cut-off bands within a wavelength range of 430 nm to 700 nm. In this embodiment, as shown in FIG. 2, the filter element 140 may have a cut-off band of 497 nm to 504 nm and a cut-off band of 592 nm to 603 nm. Therefore, a color gamut of the second light beam LB2 passing through the filter element 140 may be extended to a color gamut area conforming to a color gamut specification DCI-P3. However, the disclosure is not limited thereto. In particular, the cut-off band herein refers to a wavelength range of penetration less than 1.5%. However, the disclosure is not limited thereto.

Referring to FIG. 3, for example, the filter element 140 may include a light-transmitting substrate 141 and a filter layer 142 disposed on the light-transmitting substrate 141, and the filter layer 142 has the foregoing two cut-off bands. In this embodiment, exemplary descriptions are performed with one filter layer 142 of the filter element 140, which does not mean that the disclosure is limited thereto. In other embodiments, as shown in FIG. 6, there may also be two filter layers of a filter element 140A such as a first filter layer 142A and a second filter layer 142B, which may be respectively disposed on two opposite sides of the light-transmitting substrate 141. The configuration of the filter layers is not limited to the foregoing configuration. It is worth mentioning that the first filter layer 142A may have a first cut-off band in a wavelength range of 592 nm to 603 nm within a wavelength range of 430 nm to 700 nm (as shown in FIG. 7A), and the second filter layer 142B may have a second cut-off band in a wavelength range of 497 nm to 504 nm within the wavelength range of 430 nm to 700 nm (as shown in FIG. 7B). That is, the first filter layer 142A and the second filter layer 142B of the filter element 140A each have a cut-off band (at least one cut-off band) within a wavelength range of 430 nm to 700 nm, and a first cut-off band of the first filter layer 142A is different from (or does not overlap) a second cutoff band of the second filter layer 142B. It should be understood that in another embodiment, the two filter layers may also be disposed on the same side of the light-transmitting substrate 141, and the first cut-off band of the first filter layer may also partially overlap the second cut-off band of the second filter layer.

In order to meet the color requirements in different situations, the projection device 10 has a function of switching color gamut, for example, switching between a general color gamut and a color gamut specification DCI-P3. The color gamut switching method of the projection device 10 will be exemplarily described below.

Referring to FIGS. 1 and 4, the color gamut switching method of the projection device 10 includes: determining that the projection device 10 is set in a first mode or a second mode (step S401). In this embodiment, a color gamut area (for example, a color gamut specification DCI-P3) of the projection device 10 set in the first mode is greater than (or different from) a color gamut area (for example, a color gamut specification Rec.709) of the projection device 10 set in the second mode. For example, a user may set the first mode or the second mode as a default mode through a user interface (such as an On-Screen Display (OSD)) of the projection device 10. However, the disclosure is not limited thereto. In another aspect, an image signal processing system (not shown) of the projection device 10 may determine an optimal setting mode (for example, the first mode or the second mode) according to image content to be delivered. If the optimal setting mode cannot be determined, the projection device 10 is set as the default mode (for example, the first mode).

As described above, referring to FIG. 1, FIG. 4, and FIG. 5, the color gamut switching method of the projection device 10 further includes: after confirming that the projection device 10 is set in the first mode (step S402A), moving the filter element 140 to the transmission path of the second light beam LB2 (step S403A). However, the disclosure is not limited thereto. In other embodiment, the step S402A and S403A can be integrated into one step. Further, in this embodiment, the filter element 140 may be embedded in a frame 144. The frame 144 may be disposed on an actuating mechanism 145 (as shown in FIG. 1). When the filter element 140 is at a setting position of the second mode and the projection device 10 is set in the first mode, the actuating mechanism 145 is enabled to move the frame 144 in a direction D1 close to the second light beam LB2 (as shown in FIG. 5A), so that the filter element 140 is caused to move to the transmission path of the second light beam LB2 (as shown in FIG. 5B). In this embodiment, the actuating mechanism 145 may include a motor (for example, a stepper motor or a linear motor) and a slide rail component (not shown). However, the disclosure is not limited thereto. Referring to FIG. 8, according to other embodiments, the frame 144A provided with the filter element 140 may have a rotation axis RA, and the actuating mechanism 145 is adapted to rotate according to the rotation axis RA and drive the frame 144A and the filter element 140 to be rotated along a rotation direction RD to the transmission path of the second light beam LB2 (as shown in FIG. 8). It should be noted that a moving direction of the filter element 140 in FIG. 5A and a rotation direction of the filter element 140 in FIG. 8 are merely exemplary illustrations. In other embodiments, the moving direction or rotation direction of the filter element 140 may also be adjusted according to an actual mechanism design.

In another aspect, the color gamut switching method of the projection device 10 further includes: after confirming that the projection device 10 is set in the second mode (step S402B), moving the filter element 140 away from the transmission path of the second light beam LB2 (step S403B). However, the disclosure is not limited thereto. In other embodiment, the step S402A and S403A can be integrated into one step. Further, in this embodiment, when the filter element 140 is at the setting position of the first mode and the projection device 10 is set in the second mode, the actuating mechanism 145 is enabled to move the frame 144 in a direction (for example, a reverse direction of the direction D1) away from the second light beam LB2, so that the filter element 140 moves away from the transmission path of the second light beam LB2. However, the disclosure is not limited thereto. According to other embodiments (the embodiment shown in FIG. 8), the frame 144A may also rotate according to the rotation axis RA and drive the filter element 140 to rotate in a direction (for example, a reverse direction of the rotation direction RD) away from the second light beam LB2 to be away from the transmission path of the second light beam LB2. In particular, it can be understood by those of ordinary skill in the art to which the disclosure pertains that if a current setting position of the filter element 140 matches a mode set by the projection device 10, it is not necessary to move or rotate the position of the filter element 140.

It is worth mentioning that the filter element 140 moves into or out of the transmission path of the second light beam LB2 (or the image beam ILB) in the foregoing moving or rotating manner, which can simplify the operation complexity of the projection device 10 during color gamut switching, or avoid the complex calculation of color gamut conversion using software, and help to improve the real-time performance and convenience of the color gamut switching thereof.

With continued reference to FIG. 1, the projection device 10 may further include a wavelength separation element 150, disposed on the transmission path of the second light beam LB2 from the wavelength conversion element 110 to make the color gamut of the second light beam LB2 from the wavelength conversion element 110 closer to a color gamut specification, such as a color gamut specification Rec.709. For example, the wavelength separation element 150 may include a light-transmitting substrate (not shown), a filter layer (not shown) disposed on the light-transmitting substrate, and a rotation axis (not shown) passing through the light-transmitting substrate. The filter layer may include a plurality of filter patterns (such as a red-light filter pattern, a blue-light filter pattern, and a green-light filter pattern) surrounding around the rotation axis, and the wavelength separation element 150 may be rotated according to the rotation axis thereof, so that the filter patterns may pass through the transmission path of the second light beam LB2 sequentially and repeatedly. That is, the wavelength separation element 150 in this embodiment is, for example, a filter wheel. However, the disclosure is not limited thereto.

In this embodiment, the filter patterns of the wavelength separation element 150 may be provided corresponding to the penetrating region and at least one light conversion region of the wavelength conversion element 110. For example, at a specific time point, the red-light wavelength conversion material of the wavelength conversion element 110 is rotated onto the transmission path of the first light beam LB1, so that the first light beam LB1 is converted into the second light beam LB2 (for example, red light). At this time, the red-light filter pattern of the wavelength separation element 150 is also synchronously rotated onto the transmission path of the second light beam LB2. By analogy, by synchronizing the wavelength conversion element 110 and the wavelength separation element 150 in timing, the second light beam LB2 passing through the wavelength separation element 150 may have a predetermined color performance, for example, more conform to a color gamut specification of Rec.709. However, the disclosure is not limited thereto. According to other embodiments, the wavelength conversion element 110 may only have a yellow-light wavelength conversion material provided by surrounding around the rotation axis thereof to convert part of the first light beam LB1 to yellow light (the at least one light conversion region), and form light beams with different colors (for example, red, and green) sequentially after passing through the wavelength separation element 150. That is, the wavelength conversion element 110 and the wavelength separation element 150 may not be synchronized in timing.

Referring to FIG. 1 and FIG. 2 simultaneously, in this embodiment, the filter element 140 has an effect of improving color purity, which is specifically described below. The filter element 140 has a cut-off wavelength CW1 above 600 nm. A cut-off wavelength (not shown) of the wavelength separation element 150 above 600 nm (for example, red-light color) is less than the cut-off wavelength CW1 of the filter element 140. In particular, the cut-off wavelength herein is defined by a wavelength with a penetration of 50%. However, the disclosure is not limited thereto. In another aspect, the filter element 140 has a band-pass band BP within a wavelength range of 500 nm to 600 nm. The band-pass band BP overlaps a band-pass band (not shown) of the wavelength separation element 150 within a wavelength range of 500 nm to 600 nm. A full width at half maximum (FWHM) of the band-pass band BP of the filter element 140 is smaller than that of the band-pass band of the wavelength separation element 150. As set forth above, in the projection device 10 having the wavelength separation element 150, the filter element 140 is disposed on the transmission path of the second light beam or the image beam, and the purity of color can be improved.

More specifically, the band-pass band herein may be defined by two cut-off wavelengths. For example, a cut-off wavelength CW2 and a cut-off wavelength CW3 of the filter element 140 may define the band-pass band BP thereof, and a difference between the cut-off band CW2 and the cut-off band CW3 may roughly define the FWHM of the band-pass band BP. From another point of view, in this embodiment, the cut-off wavelength CW2 of the filter element 140 may be less than the cut-off wavelength (not shown) of the wavelength separation element 150. The cut-off wavelength CW3 of the filter element 140 may be greater than the cut-off wavelength (not shown) of the wavelength separation element 150.

It is worth mentioning that above 600 nm, the cut-off wavelength CW1 of the filter element 140 is greater than the cut-off wavelength of the wavelength separation element 150, so that the red-light color purity of the projection device 10 can be improved. Within a wavelength range of 500 nm to 600 nm, the FWHM of the band-pass band BP of the filter element 140 is smaller than that of the band-pass band of the wavelength separation element 150, so that the green-light color purity of the projection device 10 can be improved. That is, by providing the filter element 140 on the transmission path of the second light beam LB2 from the wavelength conversion element 110, the color performance of the projection device 10 can be effectively improved. In other words, the color gamut area of the projection device 10 can be increased. Therefore, the projection device 10 may switch between two color gamut (for example, a color gamut specification Rec.709 and a color gamut specification DCI-P3).

Referring to FIG. 1, in this embodiment, the projection device 10 may further include a light homogenizing element 160. The light homogenizing element 160 is disposed on the transmission path of the second light beam LB2 from the wavelength conversion element 110 and is located between the wavelength conversion element 110 and the optical engine module 120 to provide an effect of shaping and homogenizing the second light beam LB2 from the wavelength conversion element 110. More specifically, the light homogenizing element 160 is located between the wavelength separation element 150 and the filter element 140, and the second light beam LB2 from the light homogenizing element 160 is transmitted to the optical engine module 120 after passing through the filter element 140. In this embodiment, the light homogenizing element 160 is, for example, an integrating rod. However, the disclosure is not limited thereto. In other embodiments, the light homogenizing element may also be an optical integrator of a fly eye lens type.

Further, the projection device 10 may further include a light splitting and combining element 170. The light splitting and combining element 170 is disposed on the transmission path of the first light beam LB1 from the light source 100. The light splitting and combining element 170 is, for example, a dichroic mirror, a neutral density filter, a polarizing beam splitter (PBS), or other suitable light splitting and combining elements.

Hereinafter, other embodiments will be enumerated to explain the disclosure in detail. The same components will be marked with the same symbols, and the description of the same technical content will be omitted. The omitted parts refer to the foregoing embodiments, and will not be described again below.

Figure 9:
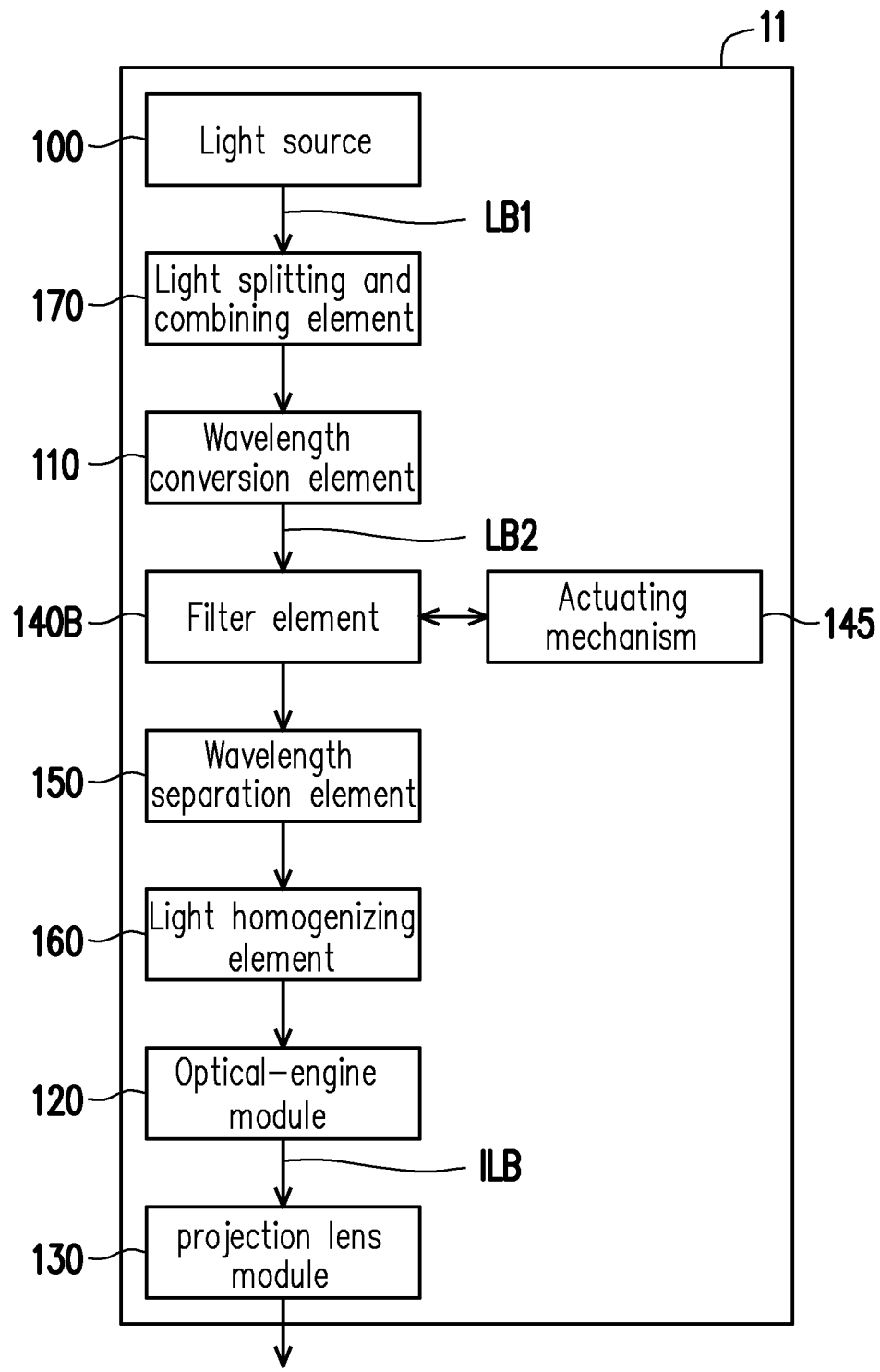
FIG. 9 is a schematic diagram of a projection device according to a second embodiment of the disclosure.

FIG. 9 is a block diagram of a projection device according to a second embodiment of the disclosure. Referring to FIG. 9, a main difference between a projection device 11 in this embodiment and the projection device 10 in FIG. 1 is that the configurations of the filter element are different. Specifically, a filter element 140B of the projection device 11 is removably disposed on the transmission path of the second light beam LB2 from the wavelength conversion element 110 and is located between the wavelength conversion element 110 and the wavelength separation element 150. Since the color gamut switching method of the projection device 11 in this embodiment is similar to the projection device 10 in the foregoing embodiment. The detailed descriptions refer to the relevant paragraphs of the foregoing embodiment, which will not be repeated herein.

Figure 10:
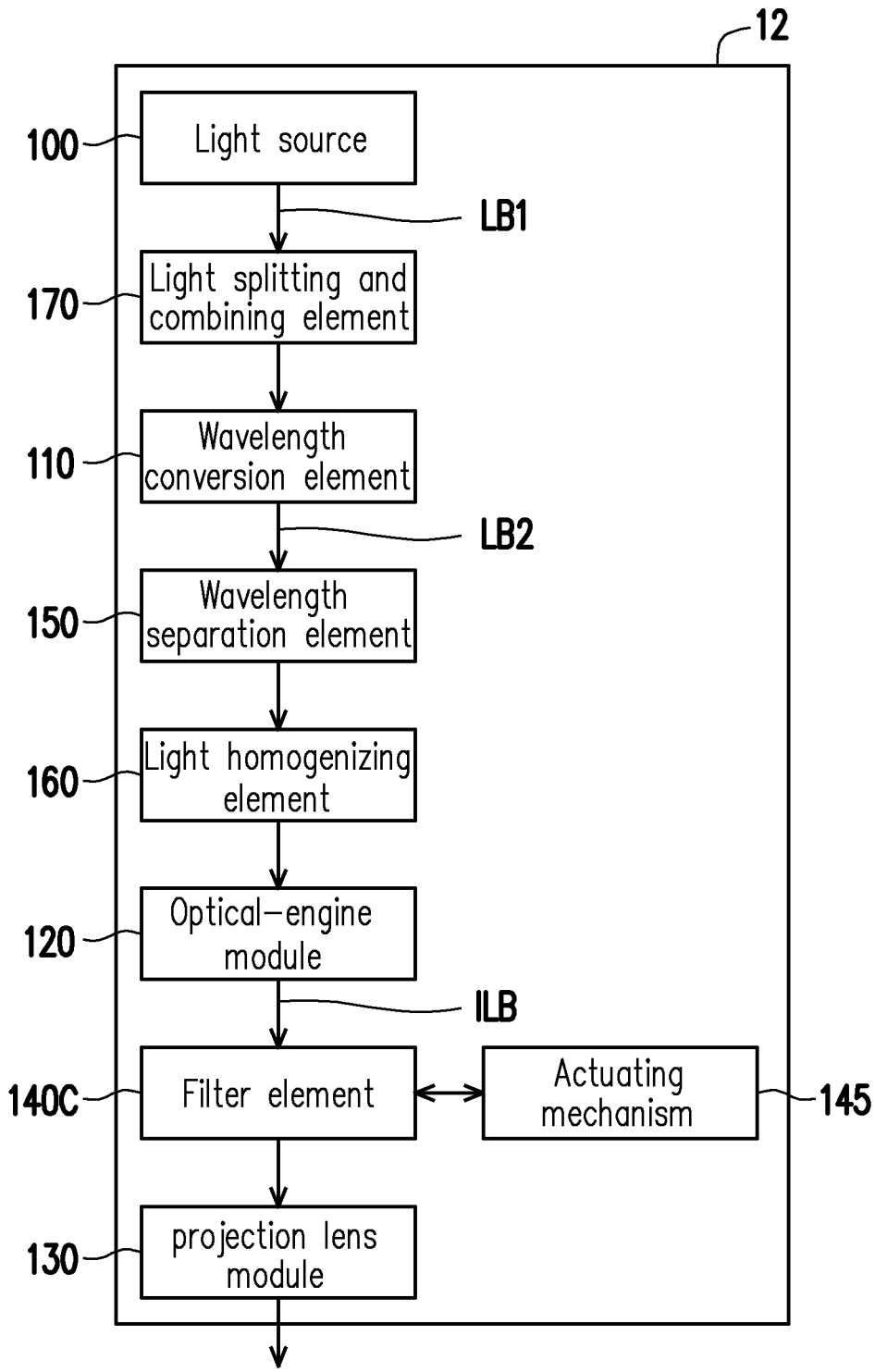
FIG. 10 is a schematic diagram of a projection device according to a third embodiment of the disclosure.

FIG. 10 is a block diagram of a projection device according to a third embodiment of the disclosure. Referring to FIG. 10, a main difference between a projection device 12 in this embodiment and the projection device 10 in FIG. 1 is that the configurations of the filter element are different. Specifically, a filter element 140C of the projection device 12 is removably disposed on the transmission path of the image beam ILB from the optical engine module 120. The image beam ILB is transmitted to the projection lens module 130 after passing through the filter element 140C. Since the color gamut switching method of the projection device 12 in this embodiment is similar to the projection device 10 in the foregoing embodiment. The detailed descriptions refer to the relevant paragraphs of the foregoing embodiment, which will not be repeated herein. It is worth mentioning that the filter element 140C moves into or out of the transmission path of the image beam ILB in the foregoing moving or rotating manner, which can simplify the operation complexity of the projection device 12 during color gamut switching, and help to improve the real-time performance and convenience of the color gamut switching thereof.

Figure 11:
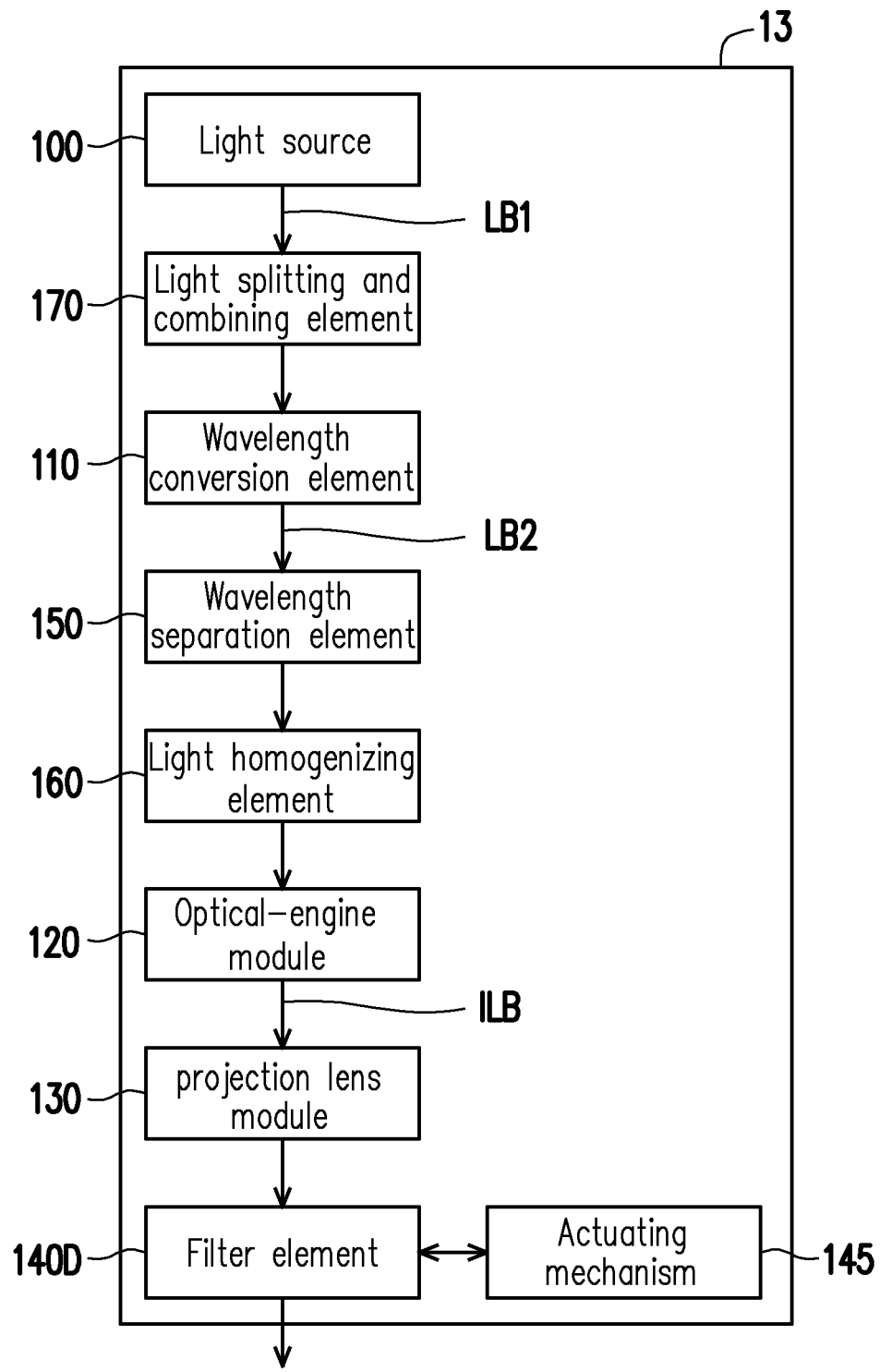
FIG. 11 is a schematic diagram of a projection device according to a fourth embodiment of the disclosure.

FIG. 11 is a block diagram of a projection device according to a fourth embodiment of the disclosure. Referring to FIG. 11, a main difference between a projection device 13 in this embodiment and the projection device 10 in FIG. 1 is that the configurations of the filter element are different. In this embodiment, a filter element 140D of the projection device 13 is removably disposed on the transmission path of the image beam ILB from the projection lens module 130. However, the disclosure is not limited thereto. According to other embodiments, the filter element may also be disposed in the projection lens module.

It is worth mentioning that although the filter element 140D of this embodiment switches color gamut by using a similar mechanical mode of the projection device 10, that is, the filter element moves into or out of the transmission path of the image beam ILB in a moving or rotating manner under the driving of the actuating mechanism 145, the disclosure is not limited thereto. In another embodiment, when the filter element 140D is disposed outside the projection device, the filter element 140D may also move into or out of the transmission path of the image beam ILB manually.

Based on the foregoing, in the projection device according to the embodiment of the disclosure, a first light beam emitted by the light source is sequentially converted into a second light beam and an image beam under the action of the wavelength conversion element and the optical engine module, respectively. The filter element is removably disposed on a transmission path of the second light beam or the image beam, so that the projection device can be switched between different color gamut to meet the color requirements in different use situations. In another aspect, in the color gamut switching method of the projection device according to the embodiment of the disclosure, the filter element moves into or out of the transmission path of the second light beam or the image beam in a moving or rotating manner, which can simplify the operation complexity of the projection device during color gamut switching and help to improve the real-time performance and convenience of the color gamut switching thereof.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A projection device, comprising: a light source, a wavelength conversion element, an optical engine module, a projection lens module, a light homogenizing element, a wavelength separation element, and a filter element, wherein
   the light source is configured to emit a first light beam;
   the wavelength conversion element is disposed on a transmission path of the first light beam, and the wavelength conversion element is configured to convert the first light beam into a second light beam;
   the optical engine module is disposed on a transmission path of the second light beam from the wavelength conversion element, the optical engine module being configured to convert the second light beam to form an image beam;
   the projection lens module is disposed on a transmission path of the image beam from the optical engine module;
   the filter element is removably disposed on the transmission path of the second light beam or the image beam;
   the wavelength separation element is disposed on the transmission path of the second light beam, wherein the wavelength separation element is configured to be rotated according to a rotation axis and to be rotated substantially synchronously with the wavelength conversion element, the wavelength separation element has a first cut-off wavelength above 600 nm, and the filter element has a second cut-off wavelength above 600 nm, and the first cut-off wavelength of the wavelength separation element is less than the second cut-off wavelength of the filter element;
   the wavelength conversion element has a no light conversion region and at least one light conversion region, and the no light conversion region and the at least one light conversion region are disposed on the transmission path of the first light beam sequentially and repeatedly; and
   the light homogenizing element is located between the wavelength separation element and the optical engine module on the transmission path of the second light beam.

2. The projection device according to claim 1, wherein the filter element has at least two cut-off bands within a wavelength range of 430 nm to 700 nm.

3. The projection device according to claim 2, wherein the at least two cut-off bands comprise a band of 497 nm to 504 nm and a band of 592 nm to 603 nm.

4. The projection device according to claim 1, wherein the filter element comprises a first filter layer and a second filter layer, the first filter layer has a first cut-off band within a wavelength range of 430 nm to 700 nm, the second filter layer has a second cut-off band within a wavelength range of 430 nm to 700 nm, and the first cut-off band is different from the second cut-off band.

5. The projection device according to claim 1, wherein the filter element is removably disposed on the transmission path of the image beam from the projection lens module.

6. The projection device according to claim 1, wherein the filter element is removably disposed on the transmission path of the second light beam, the projection device further comprising:
   an actuating mechanism, adapted to drive the filter element to move or rotate onto or away from the transmission path of the second light beam.

7. The projection device according to claim 1, wherein the filter element is removably disposed on the transmission path of the second light beam, and
   the second light beam from the light homogenizing element is transmitted to the optical engine module after passing through the filter element.

8. The projection device according to claim 1, wherein the filter element is removably disposed on the transmission path of the image beam, the projection device further comprising:
   an actuating mechanism, adapted to drive the filter element to move or rotate onto or away from the transmission path of the image beam.

9. A color gamut switching method of a projection device, comprising:
   providing a filter element that is suitable for the projection device, the projection device comprising a light source, a wavelength conversion element, an optical engine module, a projection lens module, a light homogenizing element, a wavelength separation element, and the filter element, the light source being configured to provide a first light beam, the wavelength conversion element being disposed on a transmission path of the first light beam and configured to convert the first light beam to form a second light beam, the wavelength separation element being disposed on a transmission path of the second light beam, the optical engine module being disposed on the transmission path of the second light beam and configured to convert the second light beam to form an image beam, wherein the filter element is removably disposed on the transmission path of the second light beam or a transmission path of the image beam;
   wherein the wavelength separation element is configured to be rotated according to a rotation axis and to be rotate substantially synchronously with the wavelength conversion element, the wavelength separation element has a first cut-off wavelength above 600 nm, and the filter element has a second cut-off wavelength above 600 nm, and the first cut-off wavelength of the wavelength separation element is less than the second cut-off wavelength of the filter element,
   wherein the wavelength conversion element has a no light conversion region and at least one light conversion region, the no light conversion region and the at least one light conversion region are disposed on the transmission path of the first light beam sequentially and repeatedly, and the light homogenizing element is located between the wavelength separation element and the optical engine module on the transmission path of the second light beam;

determining that the projection device is set in a first mode or a second mode, wherein a color gamut area of the projection device set in the first mode is greater than a color gamut area of the projection device set in the second mode;

after confirming that the projection device is set in the first mode, moving or rotating the filter element to the transmission path of the second light beam or the image beam; and after confirming that the projection device is set in the second mode, moving or rotating the filter element away from the transmission path of the second light beam or the image beam.

10. The color gamut switching method of the projection device according to claim 9, wherein the first mode or the second mode is set as a preset mode through a user interface.

* * * * *